United States Patent
Davis et al.

(10) Patent No.: US 9,685,841 B2
(45) Date of Patent: Jun. 20, 2017

(54) RESETTABLE ELECTRO-MECHANICALLY ACTUATED CONNECTION UNIT FOR GENERATORS

(71) Applicant: HONEYWELL INTERNATIONAL INC., Morristown, NJ (US)

(72) Inventors: Torey Davis, Peoria, AZ (US); Jens Gehrke, Rancho Palos Verdes, CA (US); Wayne Pearson, Oro Valley, AZ (US); Cristian Anghel, Oro Valley, AZ (US); Janiece Marie Cooper, Tucson, AZ (US); Mason Douglas Fritz, Monett, MO (US); Matthew Groff, Tucson, AZ (US); Tovi F. Johnson, Vail, AZ (US); Eric John Watters, Phoenix, AZ (US); Matthew A. Yturralde, Tucson, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 395 days.

(21) Appl. No.: 14/539,531

(22) Filed: Nov. 12, 2014

(65) Prior Publication Data

US 2016/0134171 A1 May 12, 2016

(51) Int. Cl.
*H02K 7/108* (2006.01)
*H02K 7/00* (2006.01)
*F16D 27/102* (2006.01)

(52) U.S. Cl.
CPC .......... *H02K 7/1085* (2013.01); *F16D 27/102* (2013.01); *H02K 7/003* (2013.01)

(58) Field of Classification Search
CPC ..... H02K 7/1085; H02K 7/003; F16D 27/102
(Continued)

(56) References Cited

U.S. PATENT DOCUMENTS 1,725,562 A * 8/1929 Borchert ............. F16D 43/2028
                                                    192/56.53
2,772,578 A    12/1956 Kling
(Continued)

FOREIGN PATENT DOCUMENTS

| EP | 1220164 A1 | 7/2002 |
| EP | 2098740 A2 | 9/2009 |
| EP | 2098741 A2 | 9/2009 |

OTHER PUBLICATIONS

European Search Report in EP Application No. 15193314.0 dated Apr. 20, 2016.

*Primary Examiner* — Alex W Mok
(74) *Attorney, Agent, or Firm* — Shimokaji IP

(57) ABSTRACT

An electrical generating system for an aircraft may include a first shaft connected with an engine gearbox, a second shaft connected with a generator of the aircraft, and a connection unit in which the first and second shafts are selectively engageable with one another. The connection unit may include a solenoid coil, an armature co-axial with the first and the second shafts, a plurality of balls positioned around the armature. The armature may include a first cylindrical segment and a second cylindrical segment. The armature may be selectively movable between a first axial position and a second axial position. When the armature is in a first axial position, the balls are positioned to transmit torque forces between the first shaft and the second shaft. When the armature is in a second axial position, the first shaft and the second shaft are free to rotate independently.

19 Claims, 7 Drawing Sheets

(58) Field of Classification Search
USPC .......................................................... 310/78
See application file for complete search history.

(56) References Cited

U.S. PATENT DOCUMENTS

| | | | |
|---|---|---|---|
| 4,121,795 A | | 10/1978 | Craven |
| 4,445,596 A | | 5/1984 | Waters |
| 4,685,550 A | | 8/1987 | Metcalf |
| 5,085,306 A | | 2/1992 | Beigang |
| 5,279,402 A | | 1/1994 | Beigang |
| 5,353,901 A | | 10/1994 | Jacques et al. |
| 5,484,043 A | * | 1/1996 | Quick ..................... B64C 13/28 188/187 |
| 5,658,087 A | * | 8/1997 | Butkovich ............. B60K 17/28 403/2 |
| 6,196,361 B1 | | 3/2001 | Russ et al. |
| 6,454,071 B1 | * | 9/2002 | Peter ....................... F16D 3/185 192/101 |
| 6,619,454 B2 | | 9/2003 | Hayward |
| 7,182,193 B2 | * | 2/2007 | Howard .................. F16D 11/14 192/101 |
| 8,074,777 B2 | | 12/2011 | Birdi et al. |
| 8,393,442 B2 | | 3/2013 | Lang et al. |
| 2014/0271201 A1 | * | 9/2014 | Covington ............. B64C 27/64 416/134 A |

\* cited by examiner

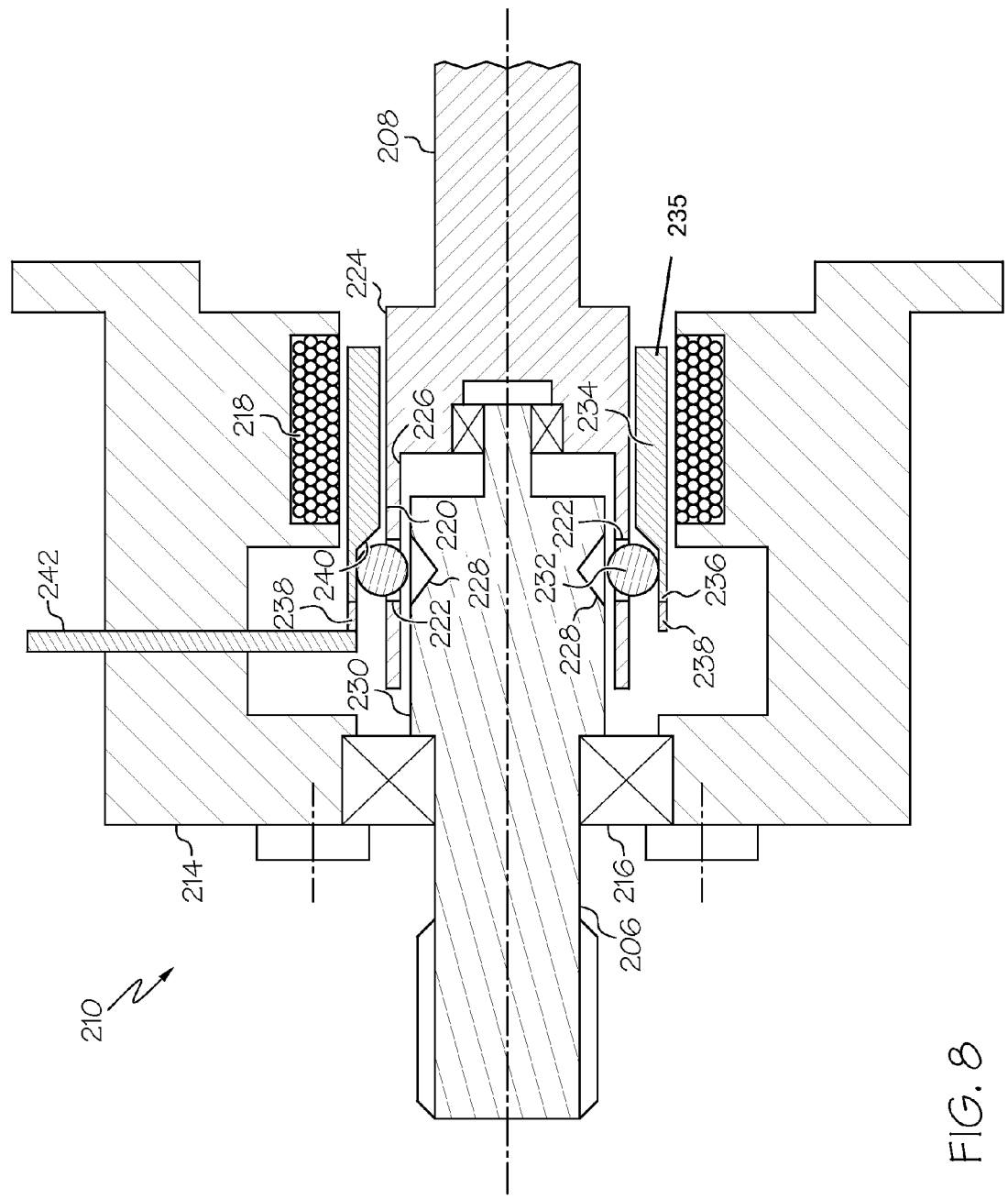

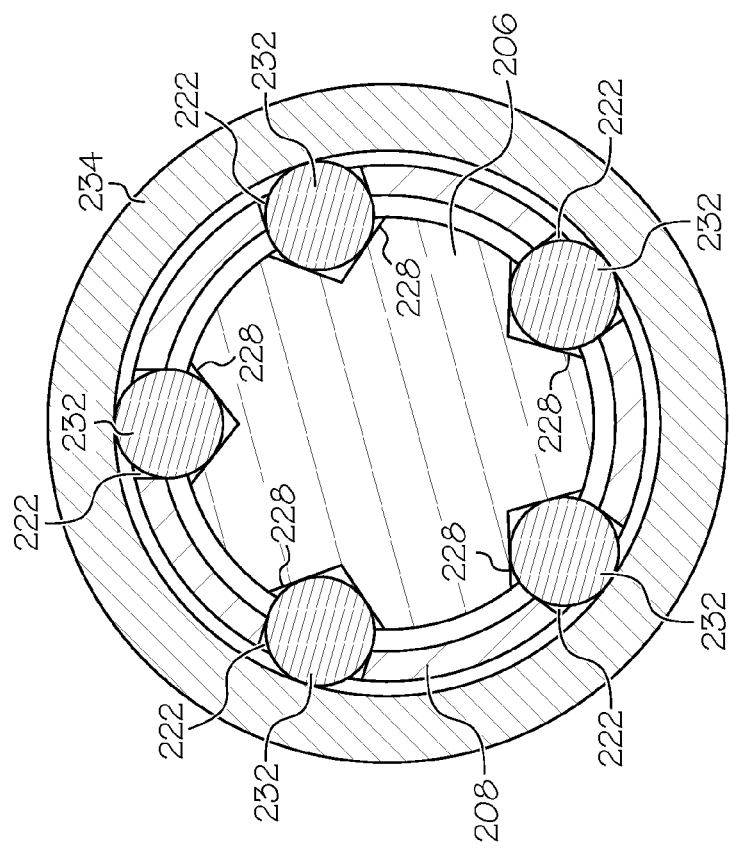
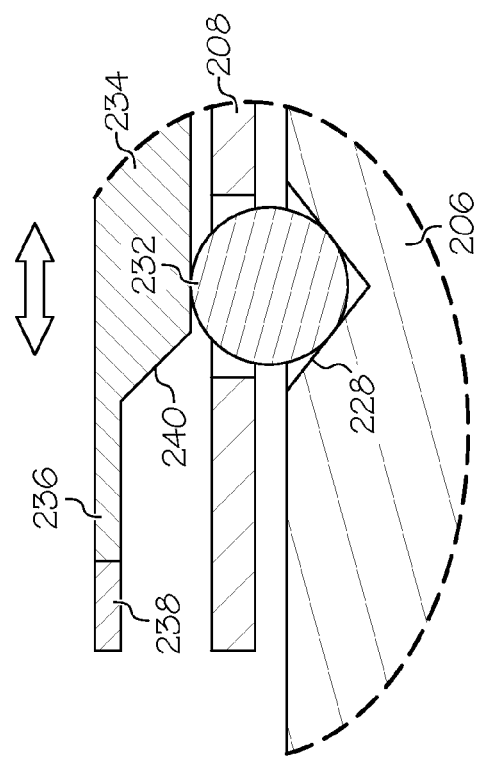

RESETTABLE ELECTRO-MECHANICALLY ACTUATED CONNECTION UNIT FOR GENERATORS

BACKGROUND OF THE INVENTION

The present invention relates to electrical generators driven by aircraft engines, and more particularly, to protection systems for preventing damage to aircraft engine gearboxes and generators.

A typical aircraft generates on-board electrical power by utilizing auxiliary power from its engines. The engines have a take-off shaft that goes through a gearbox and then to an electric generator to produce electricity for the aircraft.

If for some reason the temperature in an electric generator is suddenly higher or lower than normal or if any other abnormality occurs, like bearing failure or winding shorts, there is a need to discontinue driving the generator so that damage to the generator and/or the engine gearbox is precluded or at least minimized. Such disconnection may occur through operation of a shear section in generator driver shaft. The shear section is designed such that the increased torque will eventually shear the shaft resulting in an interruption of power being transmitted from the jet engine gearbox to the generator.

Many newer aircraft now employ variable speed, variable frequency or DC generators. A significant issue with variable speed generators is that the shaft shear section needs to be sized for minimum speed, maximum load operation. When variable speed generators are running at high speed, drive torque is much reduced for the same maximum load power. So at high speed the rotating energy to operate (i.e., break) the shear section can be very high, leading to high vibration and consequential damage.

As can be seen, there is a need for an externally operable disconnect. Additionally it is desirable that the disconnect be resettable so it can be periodically tested and then reset.

SUMMARY OF THE INVENTION

In one aspect of the present invention, an electrical generating system for an aircraft may comprise: a first shaft drivably connected with an engine gearbox of the aircraft; a second shaft co-axial with the first shaft and drivably connected with a generator of the aircraft; and a connection unit in which the first and second shafts are selectively engageable with one another. The connection unit may comprise, a solenoid coil, an armature co-axial with the first and the second shafts, a plurality of balls positioned circumferentially around the armature in contact with the armature, wherein the armature includes a first cylindrical segment and a second cylindrical segment, wherein the armature is selectively movable between a first axial position and a second axial position responsively to actuation of the solenoid coil, wherein the first axial position of the armature positions the armature so that the balls are in contact with the first cylindrical segment, wherein the second axial position of the armature positions the armature so that the balls are in contact with the second cylindrical segment, wherein the balls engage with both the first and second shaft when the armature is in the first axial position so that the balls are positioned to transmit torque forces between the first shaft and the second shaft, wherein the balls engage with only one of the first or second shaft when the armature is in the second axial position so that the first shaft and the second shaft are free to rotate independently of one another.

In another aspect of the present invention, a system for selectively connecting a generator to an aircraft engine gearbox may comprise: a stub shaft interconnected with the engine gearbox; a generator shaft interconnected with the generator, the generator shaft being co-axial with the stub shaft and having an overlapping segment positioned within a hollow overlapping segment of the stub shaft; an armature co-axial with and positioned within a hollow segment of the generator shaft, the armature having a first cylindrical segment with a first outside diameter and a second cylindrical segment with a second outside diameter smaller than the first outside diameter; a solenoid coil surrounding at least a portion of the armature, a plurality of balls circumferentially surrounding the armature; wherein the armature is selectively movable between a first axial position and a second axial position responsively to actuation of the solenoid coil, wherein the first axial position of the armature positions the armature so that the balls are in contact with the first cylindrical segment, wherein the second axial position of the armature positions the armature so that the balls are in contact with the second cylindrical segment, wherein the balls engage with both the stub shaft and the generator shaft when the armature is in the first axial position so that the balls are positioned to transmit torque forces between the stub shaft and the generator shaft, wherein the balls engage with only the generator shaft when the armature is in the second axial position so that the stub shaft and the generator shaft are free to rotate independently of one another.

In still another aspect of the present invention, a system for selectively connecting a generator to an aircraft engine gearbox may comprise: a stub shaft interconnected with the engine gearbox; a generator shaft interconnected with the generator, the generator shaft being co-axial with the stub shaft and having a hollow segment overlapping a portion of the stub shaft; a hollow armature co-axial with and surrounding the hollow segment of the generator shaft, the armature having a first cylindrical segment with a first inside diameter and a second cylindrical segment with a second inside diameter greater than the first inside diameter; a solenoid coil surrounding at least a portion of the armature, a plurality of balls circumferentially surrounding the stub shaft and contacting the armature; wherein the armature is selectively movable between a first axial position and a second axial position responsively to actuation of the solenoid coil, wherein the first axial position of the armature positions the armature so that the balls are in contact with the first cylindrical segment, wherein the second axial position of the armature positions the armature so that the balls are in contact with the second cylindrical segment, wherein the balls engage with both the stub shaft and the generator shaft when the armature is in the first axial position so that the balls are positioned to transmit torque forces between the stub shaft and the generator shaft, wherein the balls engage with only the generator shaft when the armature is in the second axial position so that the stub shaft and the generator shaft are free to rotate independently of one another.

These and other features, aspects and advantages of the present invention will become better understood with reference to the following drawings, description and claims.

BRIEF DESCRIPTION OF THE DRAWINGS

FIG. 8 is a cross-sectional view of the connection system of FIG. 7 in a second operational mode in accordance with the second exemplary embodiment of the invention;

FIG. 9 is a detailed view of a portion of the connection system of FIG. 7 accordance with the second exemplary embodiment of the invention; and FIG. 10 is a cross-sectional view taken along the lines 10-10 of a portion of the connection system of FIG. 7 in accordance with an exemplary embodiment of the invention;

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Figure 1:
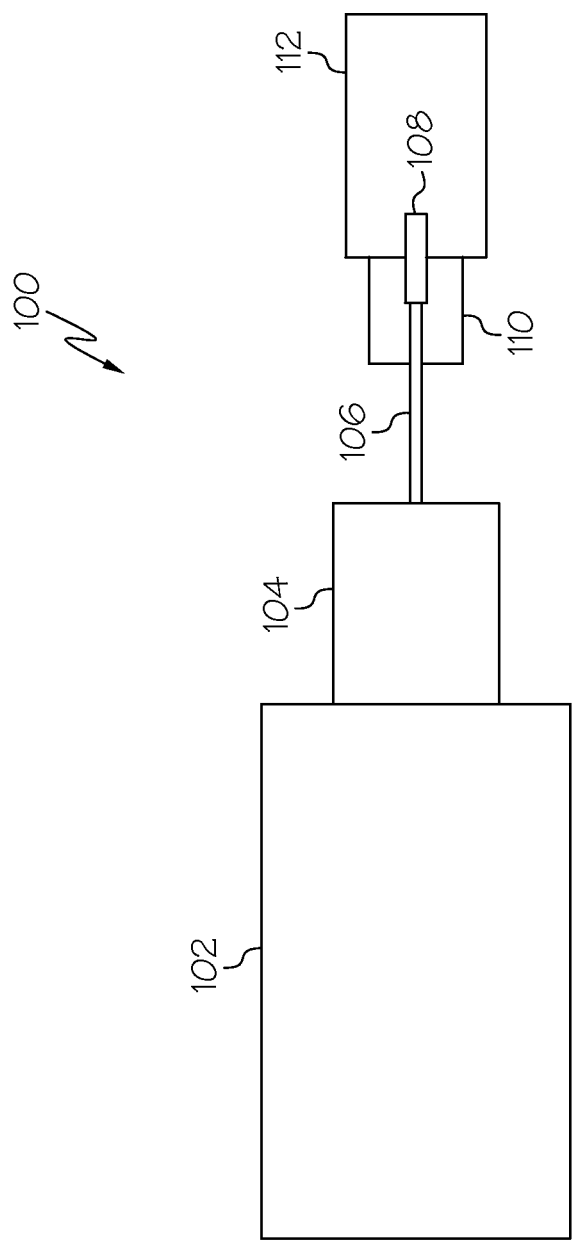
FIG. 1 is a schematic diagram of an electrical generating system for an aircraft in accordance with an exemplary embodiment of the invention.

The present invention generally provides an aircraft generator disconnect system that employs a solenoid actuated armature which may selectively release torque transmitting balls from their torque transmitting locations to allow a generator driving shaft to rotate independently from a generator input shaft, thereby achieving selective mechanical disconnection of the generator from its mechanical power source. More particularly, the present invention provides for a re-settable disconnect system. Moreover, the present invention accommodates torque transmission in both a clockwise and counterclockwise direction Turning now to the description and with reference first to FIG. 1, a schematic diagram may illustrate an electrical generating system 100 that may be employed in an aircraft (not shown). An engine 102 may be connected to gearbox 104. A stub shaft 106 may extend from the gear box 104 and connect with a generator shaft 108 within a connection unit 110. The stub shaft 106 may be considered to be drivably connected with the engine 102. Under normal operating conditions rotation of the stub shaft 106 may drive the generator shaft 108 to drive a generator 112. In the event of an operational anomaly of the generator 112, the connection unit 110 may be actuated, as described hereinbelow, to disengage the stub shaft 106 from the generator shaft 108. The stub shaft 106 and the generator shaft 108 may be considered to be selectively connected.

Figure 2:
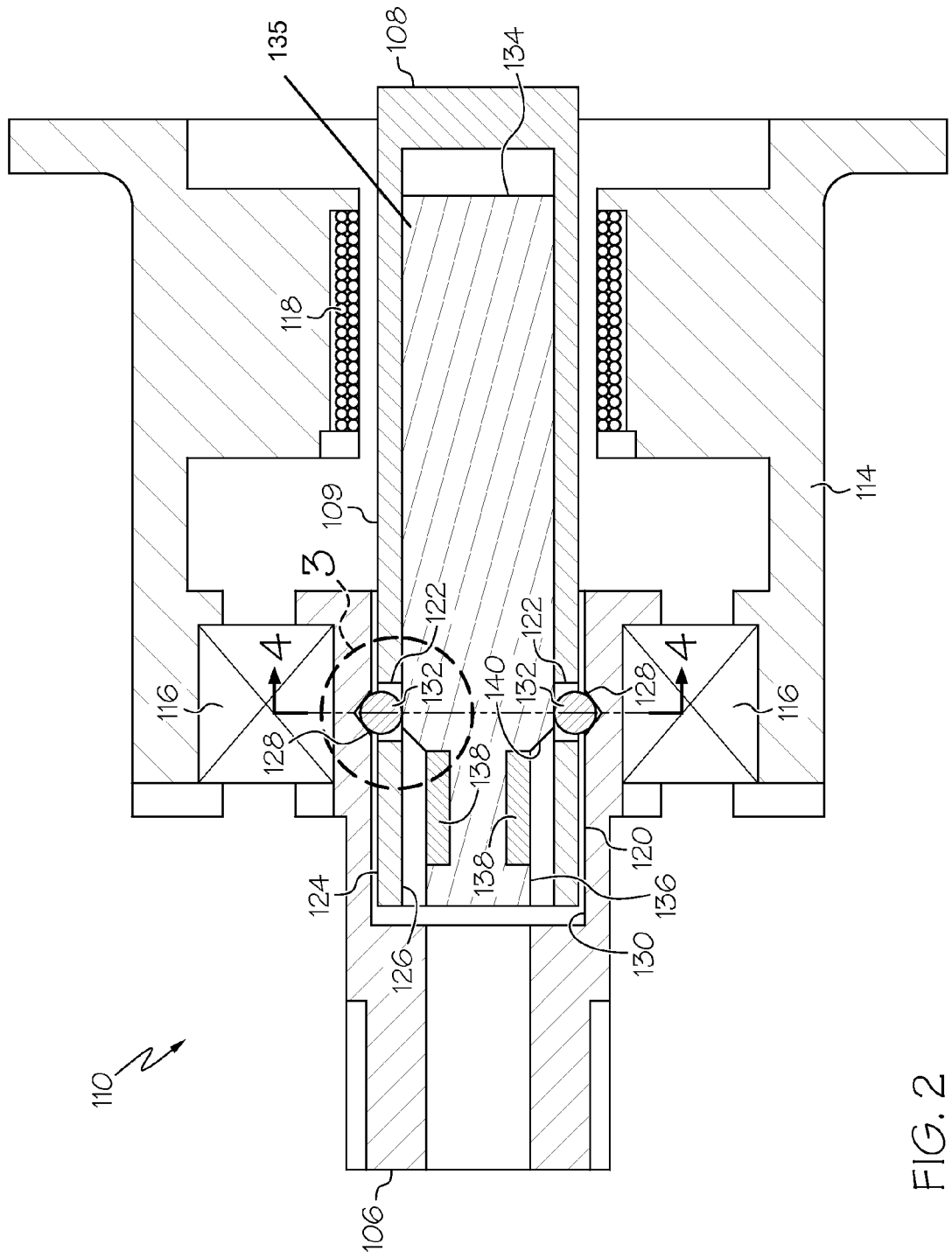
FIG. 2 is a cross-sectional view of a connection system in accordance with an exemplary embodiment of the invention.
Figure 4:
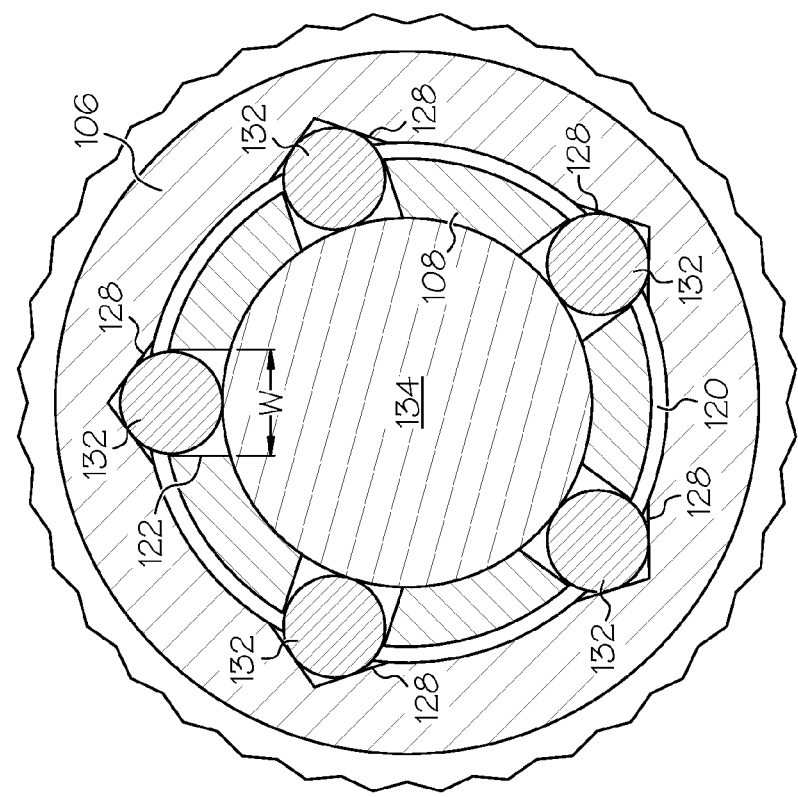
FIG. 4 is a cross-sectional view taken along the lines 4-4 of a portion of the connection system of FIG. 2 in accordance with an exemplary embodiment of the invention.
Figure 3:
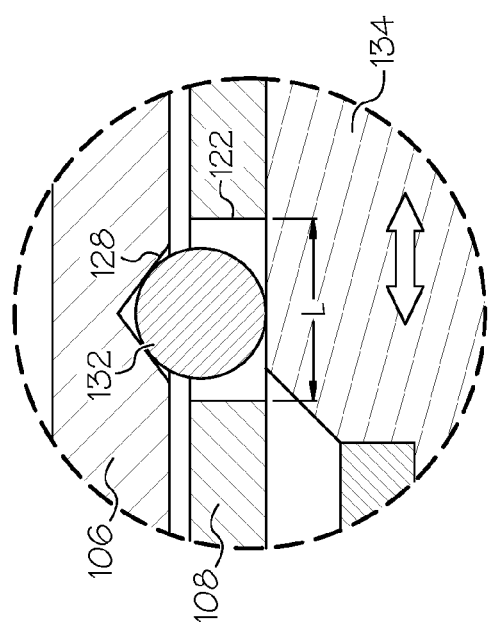
FIG. 3 is a detailed view of a portion of the connection system of FIG. 2 accordance with an exemplary embodiment of the invention.

Referring now to FIGS. 2, 3, 4, 5 and 6, a cross-sectional view of an exemplary embodiment of the connection unit 110 illustrates operational features of the unit. The connection unit 110 may include a housing 114 which may be supported on the generator 112 (See FIG. 1). The housing 114 may support a stub shaft bearing 116 and a solenoid coil 118. The stub shaft 106 and the generator shaft 108 may be positioned in an overlapping relationship along an interface 120. The generator shaft 108 may have a hollow segment 109 that is in the overlapped relationship with the stub shaft 106. A plurality of holes 122 may pass between an outer surface 124 of the generator shaft and in inner surface 126 of the generator shaft 108 (i.e., through a wall of the generator shaft 108). The stub shaft 106 may be provided with a plurality of detents 128 formed into its inner surface 130. A plurality of balls 132 may be positioned within the holes 122. As shown in FIGS. 2, 3 and 4, the balls 132 may rest against an armature 134 that may be positioned inside the generator shaft 108. The armature 134 may comprise a first cylindrical segment 135 and a second reduced-diameter cylindrical segment 136. The balls 132 may be large enough and the wall thickness of the generator shaft 108 may be small enough so that a portion of each of the balls 132 may project into and beyond the interface 120. The detents 128 may be axially aligned with the holes 122. Each one of the balls 132 may be aligned with one of the detents 128. The holes 122 and the detents 128 may be considered to be ball-engagement openings. It may be seen that selective radial displacement of the balls 132 may result is selective interconnection between the stub shaft 106 and the generator shaft 108.

Rotation the stub shaft 108 may transmit torque forces through the balls 132 and into the generator shaft 108. Conversely, rotation of the generator shaft 108 may result in torque forces being transmitted to the stub shaft 106. In other words, the connection unit 110 may transmit torque forces during clockwise or counterclockwise rotation of the shafts 106 and 108. Consequently, the generator 112 may function as a starter-generator.

Figure 6:
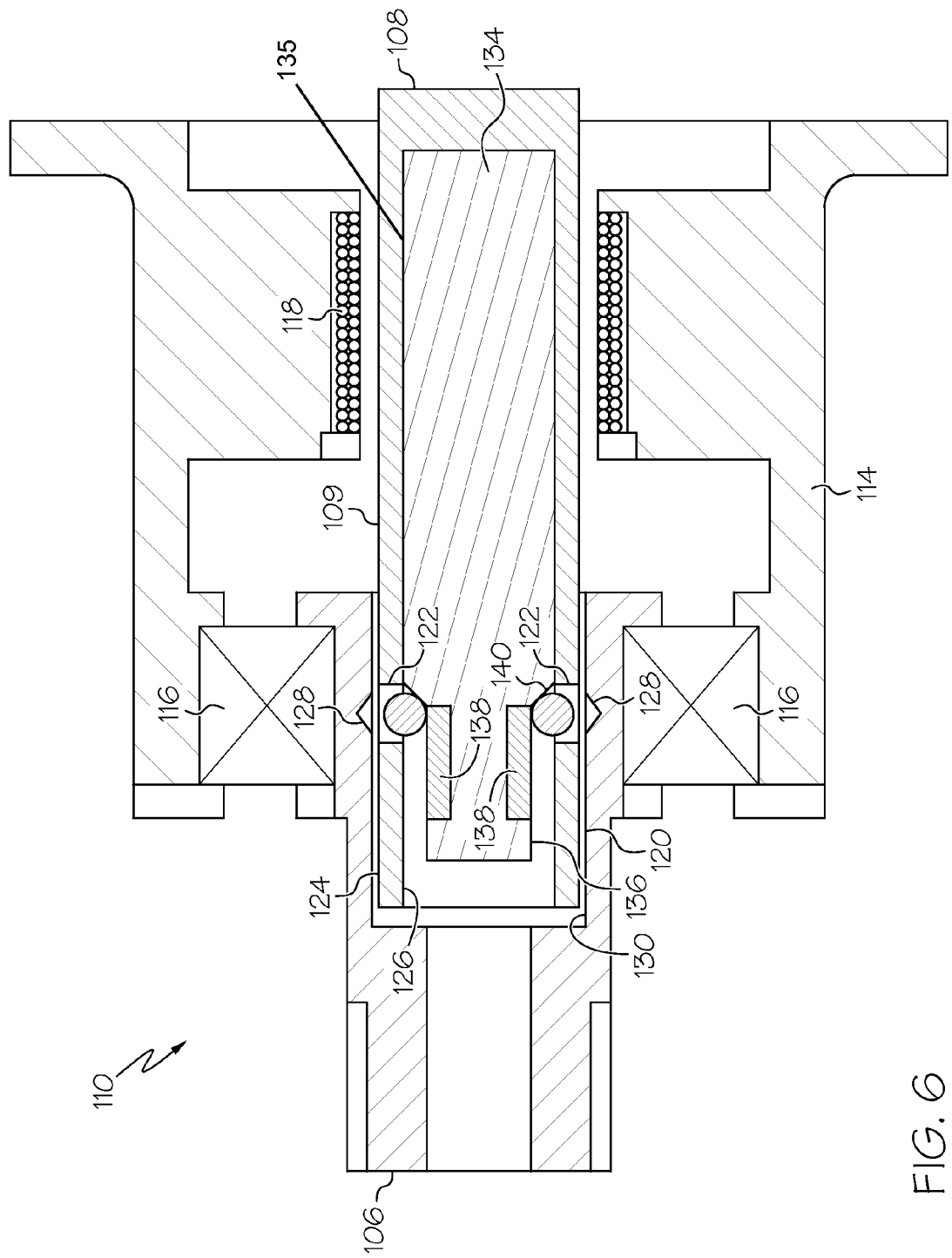
FIG. 6 is a cross-sectional view of the connection system of FIG. 2 in a second operational mode in accordance with an exemplary embodiment of the invention.

Referring now to FIG. 6, the connection unit 110 is illustrated in a disconnected state. In that regard, it may be seen that the armature 134 is re-positioned so that the reduced-diameter cylindrical segment 136 is positioned under the balls 132. The armature 134 may be moved between a first axial position and a second axial position by energizing the solenoid coil 118. The diameter of the segment 136 is small enough so that when the balls 132 rest against the segment 136, the balls 132 may be released from the detents 128 of the stub shaft 106. The diameter of the segment 136 is large enough so than when the balls 132 are in contact with the segment 136, the balls 132 remain engaged with the holes 122. In that configuration, the stub shaft 106 and the generator shaft 108 may be disconnected and thus may be free to rotate independently of one another.

One or more permanent magnets 138 may be positioned on the armature 134. When the connection unit 110 is in a disconnected state the magnets 138 may be aligned with the balls 132. The magnets 138 may magnetically hold the balls 132 in their disconnected state so that the balls 132 may not inadvertently re-engage with the detents 128.

The solenoid coil 118 may be connected so that it may selectively drive the armature 134 into a disconnection position as shown in FIG. 6 or return the armature 134 into a connection position as shown in FIG. 2. When the armature is driven into a connection position, a conical transition segment 140 of the armature 134 may drive the balls away from the magnets 138 and into re-engagement with the detents 128. In other words, the connection unit 110 may be advantageously re-settable with a simple operation of the solenoid coil 118.

Referring now more particularly to FIGS. 3 and 4 it may be seen, that in an exemplary embodiment of the connection unit 110, the holes 122 may be formed as slots. The holes may have a width W that is only slightly larger than a diameter of the balls 132. The holes 122 may have a length L is larger than the width W. In this regard, the balls 132 may be provided with axial clearance so that upon operation of the solenoid coil 118 (FIGS. 1 and 5), the balls 132 may roll within the slotted holes 122. Consequently, the armature 134 may be axially moved into its disconnection position while encountering only minimal rolling friction relative to the balls 132. Rolling action of the balls 132 during disconnection may be desirable because resultant disconnection force may be less than that which might result from sliding interaction between the balls 132 and the armature 134.

In the exemplary embodiment of the connection unit 110 of FIGS. 3 and 4, the detents 128 may be formed as conical pockets in the inner surface 130 of the stub shaft 106. The conical configuration of the detents 128 may reduce the risk of a failure of the balls 132 to release from the detents 128 when there is a high torque loading between the shafts 106 and 108. High torque loading may actually result in the balls 132 being forced out of the detents 128 when the armature 134 is moved to its disconnection position. In other words, conical configuration of the detents 128 may contribute to assuring positive disconnection by the connection unit 110 under a wide range of torque loading conditions.

Figure 5:
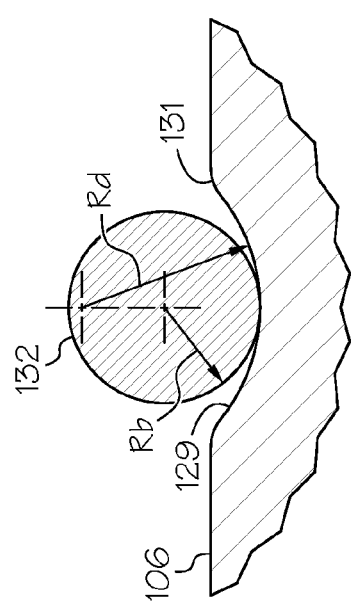
FIG. 5 is a detailed view of a radiused detent and ball connection in accordance with an exemplary embodiment of the invention.

In still another embodiment shown in FIG. 5, detents 129 may be formed as radiused slots or pockets. A radius (Rd) of the detent 129 may be larger than a radius (Rb) of the ball 132. The radiused detents 129 may provide particularly high load carrying geometry for hertzian contact stress. Outer edges 131 of the detents 129 may radiused to facilitate positive disconnection by the connection unit 110 under a wide range of torque loading conditions.

Figure 7:
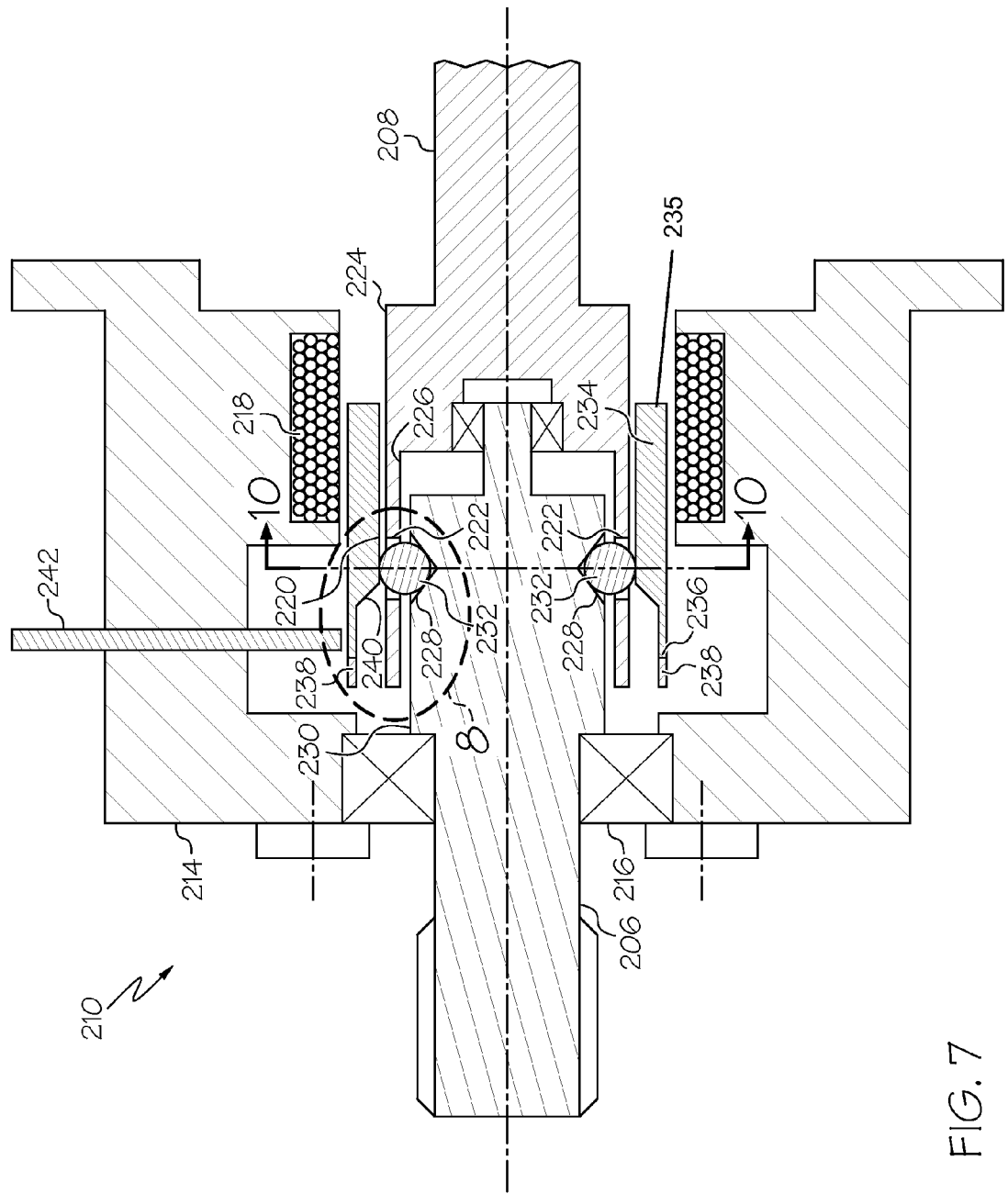
FIG. 7 is a cross-sectional view of a connection system in accordance with a second exemplary embodiment of the invention.

Referring now to FIGS. 7, 9 and 10, a cross-sectional view of an exemplary embodiment of a connection unit 210 illustrates operational features of the unit. The connection unit 210 may include a housing 214 which may be supported on the generator 112 (See FIG. 1). The housing 214 may support a stub shaft bearing 216 and a solenoid coil 218. A stub shaft 206 and a generator shaft 208 may be positioned in an overlapping relationship along an interface 220. The generator shaft 208 may be hollow along that portion of its length that is in the overlapped relationship with the stub shaft 206. A plurality of holes 222 may pass between an outer surface 224 of the generator shaft 208 and an inner surface 226 of the generator shaft 208. The stub shaft 206 may be provided with a plurality of detents 228 formed into its outer surface 230.

A plurality of balls 232 may be positioned within the holes 222. As shown in FIGS. 6 and 8, the balls 232 may be held in engagement with the detents 228 by an armature 234 that may be positioned around the generator shaft 208. The armature 234 may comprise a first cylindrical segment 235 and a second cylindrical segment 236 with an enlarged internal diameter. The balls 232 may be large enough and a wall thickness of the generator shaft 208 may be small enough so that a portion of each of the balls 232 may project into and beyond the interface 220. The detents 228 may be aligned with the holes 222. Each one of the balls 232 may be aligned with one of the detents 228.

Rotation the stub shaft 206 may transmit torque forces through the balls 232 and into the generator shaft 208. Conversely, rotation of the generator shaft 208 may result in torque forces being transmitted to the stub shaft 206. In other words, the connection unit 210 may transmit torque forces during clockwise or counterclockwise rotation of the shafts 206 and 208. Consequently, the generator 112 may function as a starter-generator.

Referring now to FIG. 8, the connection unit 210 is illustrated in a disconnected state. In that regard, it may be seen that the armature 234 is re-positioned so that the enlarged-diameter cylindrical segment 236 is positioned over the balls 232. The armature 234 may be moved in an axial direction by energizing the solenoid coil 218. The internal diameter of the segment 236 is great enough so that when the balls 232 rest against the segment 236, the balls 232 may be released from the detents 228 of the stub shaft 206. The diameter of the segment 236 is small enough so than when the balls 232 are in contact with the segment 236, the balls 232 remain engaged with the holes 222. In that configuration, the stub shaft 206 and the generator shaft 208 may be disconnected and thus may be free to rotate independently of one another.

One or more permanent magnets 238 may be positioned on the armature 234. When the connection unit 210 is in a disconnected state the magnets 238 may be aligned with the balls 232. The magnets 238 may hold the balls 232 in their disconnected state so that the balls 232 may not inadvertently re-engage with the detents 228.

The solenoid coil 218 may be connected so that it may selectively drive the armature 234 into a disconnection position as shown in FIG. 8 or return the armature 234 into a connection position as shown in FIG. 7. When the armature 234 is driven into a connection position, a conical transition segment 240 of the armature 234 may drive the balls 232 away from the magnets 238 and into re-engagement with the detents 228. In other words, the connection unit 210 may be advantageously re-settable with a simple operation of the solenoid coil 218. A locking latch 242 may be provided to lock the armature in a disconnected position so that inadvertent re-engagement of the connection unit may be precluded without positive release of the locking latch 242.

As described above with respect to the connection unit 110 and for the same advantageous reasons, the holes 222 may be slotted holes and the detents 228 may have a conical configuration.

It should be understood, of course, that the foregoing relates to exemplary embodiments of the invention and that modifications may be made without departing from the spirit and scope of the invention as set forth in the following claims.

We claim:

1. An electrical generating system for an aircraft comprising:
   a first shaft drivably connected with an engine gearbox of the aircraft;
   a second shaft co-axial with the first shaft and drivably connected with a generator of the aircraft; and
   a connection unit in which the first and second shafts are selectively engageable with one another, the connection unit comprising,
   a solenoid coil,
   an armature co-axial with the first and the second shafts,
   a plurality of balls positioned circumferentially around the armature in contact with the armature,
   wherein the armature includes a first cylindrical segment and a second cylindrical segment, wherein the armature is selectively movable between a first axial position and a second axial position responsively to actuation of the solenoid coil, wherein the first axial position of the armature positions the armature so that the balls are in contact with the first cylindrical segment, wherein the second axial position of the armature positions the armature so that the balls are in contact with the second cylindrical segment, wherein the balls engage with both the first and second shaft when the armature is in the first axial position so that torque loading between the first and second shaft is transmitted exclusively through the balls, wherein the balls engage with only one of the first or second shaft when the armature is in the second axial position so that the first shaft and the second shaft are free to rotate independently of one another, and wherein the balls roll during axial movement of the armature.

2. The system of claim 1 wherein the first cylindrical segment of the armature has an outside diameter greater than an outside diameter of the second cylindrical segment of the armature.

3. The system of claim 1 wherein the first cylindrical segment of the armature has an inside diameter smaller than an inside diameter of the second cylindrical segment.

4. The system of claim 1 further comprising one or more permanent magnets positioned in the second cylindrical segment to magnetically hold the balls in contact with the second cylindrical segment when the first and the second shafts are free to rotate independently of one another.

5. The system of claim 1:

wherein the first shaft and the second shaft are positioned in a co-axial overlapping configuration within the connection unit;

wherein the first shaft is provided with a plurality of first ball-engagement openings;

wherein the second shaft is provided with a plurality of second ball-engagement openings;

wherein the first ball-engagement openings are axially aligned with the second ball-engagement openings so that selective radial displacement of the balls produces selective connection or disconnection of the first and the second shafts.

6. The system of claim 5:

wherein the first shaft has an overlapping segment that has an inside diameter greater than an outside diameter of an overlapping segment of the second shaft;

wherein the second ball-engagement openings are slotted holes which pass through a wall of the overlapping segment of the second shaft.

7. The system of claim 1 wherein the armature includes a conical transition segment interposed between the first cylindrical segment and the second cylindrical segment.

8. A system for selectively connecting a generator to an aircraft engine gearbox comprising:

a stub shaft interconnected with the engine gearbox;

a generator shaft interconnected with the generator, the generator shaft being co-axial with the stub shaft and having an overlapping segment positioned within a hollow overlapping segment of the stub shaft;

an armature co-axial with and positioned within a hollow segment of the generator shaft, the armature having a first cylindrical segment with a first outside diameter and a second cylindrical segment with a second outside diameter smaller than the first outside diameter;

a solenoid coil surrounding at least a portion of the armature;

a plurality of balls circumferentially surrounding the armature; and one or more permanent magnets positioned in the second cylindrical segment of the armature to magnetically hold the balls in contact with the second cylindrical segment when the stub shaft and the generator shaft are free to rotate independently of one another, wherein the armature is selectively movable between a first axial position and a second axial position responsively to actuation of the solenoid coil, wherein the first axial position of the armature positions the armature so that the balls are in contact with the first cylindrical segment, wherein the second axial position of the armature positions the armature so that the balls are in contact with the second cylindrical segment, wherein the balls engage with both the stub shaft and the generator shaft when the armature is in the first axial position so that the balls are positioned to transmit torque forces between the stub shaft and the generator shaft, wherein the balls engage with only the generator shaft when the armature is in the second axial position so that the stub shaft and the generator shaft are free to rotate independently of one another.

9. The system of claim 8 wherein the solenoid is a bi-directional solenoid.

10. The system of claim 8 wherein the solenoid surrounds a portion of the generator shaft.

11. The system of claim 8:

wherein the generator shaft is provided with a plurality of first ball-engagement openings;

wherein the stub shaft is provided with a plurality of second ball-engagement openings;

wherein the first ball-engagement openings are axially aligned with the second ball-engagement openings so that selective radial displacement of the balls produces selective connection or disconnection of the stub shaft and the generator shaft.

12. The system of claim 11 wherein the first ball-engagement openings comprise slotted holes through a wall of the hollow segment of the generator shaft.

13. The system of claim 11 wherein the second ball-engagement openings comprise conical detents formed in an inner surface of a hollow segment of the stub shaft.

14. A system for selectively connecting a generator to an aircraft engine gearbox comprising:

a stub shaft interconnected with the engine gearbox;

a generator shaft interconnected with the generator, the generator shaft being co-axial with the stub shaft and having a hollow segment overlapping a portion of the stub shaft;

a hollow armature co-axial with and surrounding the hollow segment of the generator shaft, the armature having a first cylindrical segment with a first inside diameter and a second cylindrical segment with a second inside diameter greater than the first inside diameter;

a solenoid coil surrounding at least a portion of the armature, a plurality of balls circumferentially surrounding the stub shaft and contacting the armature;

wherein the armature is selectively movable between a first axial position and a second axial position responsively to actuation of the solenoid coil, wherein the first axial position of the armature positions the armature so that the balls are in contact with the first cylindrical segment, wherein the second axial position of the armature positions the armature so that the balls are in contact with the second cylindrical segment, wherein the balls engage with both the stub shaft and the generator shaft when the armature is in the first axial position so that torque loading between the stub shaft and the generator shaft is transmitted exclusively through the balls, wherein the balls engage with only the generator shaft when the armature is in the second axial position so that the stub shaft and the generator shaft are free to rotate independently of one another, and wherein the balls roll during axial movement of the armature.

15. The system of claim 14:

wherein the solenoid is a bi-directional solenoid; and wherein the solenoid surrounds a portion of the generator shaft.

16. The system of claim 14:

wherein the generator shaft is provided with a plurality of first ball-engagement openings;

wherein the stub shaft is provided with a plurality of second ball-engagement openings;

wherein the first ball-engagement openings are axially aligned with the second ball-engagement openings so that selective radial displacement of the balls produces selective connection or disconnection of the stub shaft and the generator shaft;

wherein the first ball-engagement openings comprise slotted holes through a wall of the hollow segment of the generator shaft; and wherein the second ball-engagement openings comprise conical detents formed in an outer surface of the stub shaft.

17. The system of claim 14 further comprising one or more permanent magnets positioned in the second cylindrical segment of the armature to magnetically hold the balls in contact with the second cylindrical segment when the stub shaft and the generator shaft are free to rotate independently of one another.

18. The system of claim 14 wherein the armature includes a conical transition segment interposed between the first cylindrical segment and the second cylindrical segment.

19. The system of claim 14 further comprising a latching lock configured to engage with the armature when the armature is in its second axial position.

* * * * *